United States Patent
Nishimura et al.

(10) Patent No.: US 10,703,124 B2
(45) Date of Patent: Jul. 7, 2020

(54) IMAGE ERASING APPARATUS AND IMAGE ERASING METHOD

(71) Applicants: KABUSHIKI KAISHA TOSHIBA, Tokyo (JP); TOSHIBA TEC KABUSHIKI KAISHA, Tokyo (JP)

(72) Inventors: Yosuke Nishimura, Suntougun Nagaizumi Shizuoka (JP); Kazumasa Yasui, Arakawa Tokyo (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/277,915

(22) Filed: Feb. 15, 2019

(65) Prior Publication Data

US 2019/0184730 A1 Jun. 20, 2019

Related U.S. Application Data

(63) Continuation of application No. 15/168,610, filed on May 31, 2016, now Pat. No. 10,245,871.

(30) Foreign Application Priority Data

Jul. 14, 2015 (JP) ................... 2015-140480

(51) Int. Cl.
*B41M 7/00* (2006.01)
*B41J 2/32* (2006.01)
(Continued)

(52) U.S. Cl.
CPC .............. *B41M 7/0009* (2013.01); *B41J 2/32* (2013.01); *G06K 15/16* (2013.01);
(Continued)

(58) Field of Classification Search
CPC . B41M 7/0009; G06K 15/16; G06K 15/4025; G06K 15/4095; H04N 1/00795; H04N 1/00803; B41J 2/32; B41J 2202/37
See application file for complete search history.

(56) References Cited

U.S. PATENT DOCUMENTS 7,382,483 B2  6/2008 Muranaka
8,538,317 B2  9/2013 Iguchi
(Continued)

FOREIGN PATENT DOCUMENTS

CN  102555512 A  7/2012
JP  2003-054072 A  2/2003
(Continued)

OTHER PUBLICATIONS

Machine translation of JP 2015-070448, published on Apr. 2015 (Year: 2015).*

(Continued)

*Primary Examiner* — Huan H Tran
(74) *Attorney, Agent, or Firm* — Kim & Stewart LLP

(57) ABSTRACT

According to an embodiment, an image erasing apparatus includes a reading unit, an erasing unit, an image forming unit, and a controller. The reading unit reads identification information formed on a sheet conveyed. The erasing unit erases a part or all of a first image formed on the sheet after the identification information is read. The controller obtains image data corresponding to the identification information that is read by the reading unit. The controller controls the image forming unit so as to form a second image, which is indicated by the obtained image data, onto the sheet from which the first image has been erased.

20 Claims, 5 Drawing Sheets

(51) Int. Cl.
*G06K 15/16* (2006.01)
*G06K 15/00* (2006.01)
*H04N 1/00* (2006.01)

(52) U.S. Cl.
CPC ..... *G06K 15/4025* (2013.01); *G06K 15/4095* (2013.01); *H04N 1/00795* (2013.01); *H04N 1/00803* (2013.01); *B41J 2202/37* (2013.01)

(56) References Cited

U.S. PATENT DOCUMENTS

| | | | |
|---|---|---|---|
| 8,570,353 B2* | 10/2013 | Furukawa | B41J 2/4753 347/179 |
| 8,579,404 B2 | 11/2013 | Arimura | |
| 8,743,164 B2 | 6/2014 | Iguchi et al. | |
| 8,760,480 B1 | 6/2014 | Kubo | |
| 8,810,855 B1 | 8/2014 | Phillips et al. | |
| 9,025,210 B2 | 5/2015 | Tomizawa et al. | |
| 9,124,818 B2 | 9/2015 | Megawa | |
| 9,211,745 B2 | 12/2015 | Kubo | |
| 9,452,615 B2 | 9/2016 | Arima | |
| 10,245,871 B2* | 4/2019 | Nishimura | B41M 7/0009 |
| 2005/0057633 A1* | 3/2005 | Meyerhofer | B41J 2/32 347/105 |
| 2006/0104697 A1* | 5/2006 | Meyerhofer | B41J 2/32 400/521 |
| 2007/0134042 A1* | 6/2007 | Meyerhofer | B41J 13/12 400/521 |
| 2011/0222130 A1 | 9/2011 | Iguchi et al. | |
| 2011/0235075 A1 | 9/2011 | Iguchi et al. | |
| 2011/0317198 A1 | 12/2011 | Suzuki | |
| 2012/0038941 A1 | 2/2012 | Megawa | |
| 2012/0162340 A1 | 6/2012 | Furukawa et al. | |
| 2012/0257264 A1 | 10/2012 | Megawa | |
| 2013/0016375 A1 | 1/2013 | Hashidume et al. | |
| 2013/0070265 A1 | 3/2013 | Megawa et al. | |
| 2013/0070305 A1 | 3/2013 | Tomizawa et al. | |
| 2014/0063511 A1 | 3/2014 | Tomizawa | |
| 2014/0192127 A1 | 7/2014 | Arima | |
| 2014/0192128 A1 | 7/2014 | Arima | |
| 2014/0240435 A1 | 8/2014 | Kubo | |
| 2015/0124270 A1 | 5/2015 | Megawa | |
| 2016/0279964 A1 | 9/2016 | Ando | |

FOREIGN PATENT DOCUMENTS

| | | |
|---|---|---|
| JP | 2006-181807 A | 7/2006 |
| JP | 2012-135891 A | 7/2012 |
| JP | 2013-020069 A | 1/2013 |
| JP | 2015-70448 A | 4/2015 |

OTHER PUBLICATIONS

Notification of Reasons for Refusal dated Jan. 22, 2019 in corresponding Japanese Patent Application No. 2015-140480 with English machine translation, 6 pages.

First Office Action dated Sep. 5, 2018 in corresponding Chinese Patent Application No. 20161042952.6 with English translation, 13 pages.

Notice of Reasons for Refusal dated Jun. 25, 2019 in corresponding Japanese Patent Application No. 2015-140480 with machine English translation, 6 pages.

* cited by examiner

IMAGE ERASING APPARATUS AND IMAGE ERASING METHOD

CROSS-REFERENCE TO RELATED APPLICATION

This application is a continuation of U.S. patent application Ser. No. 15/168,610, filed on May 31, 2016, which application is based upon and claims the benefit of priority from the prior Japanese Patent Application No. 2015-140480, filed on Jul. 14, 2015, the entire contents of which are incorporated herein by reference.

FIELD

Embodiments described herein relate generally to an apparatus.

BACKGROUND

In recent years, there is a method to issue a reserved-seat ticket having a seat number printed thereon on the day of the event in order to prevent resale of a ticket of an event and the like. In this method, a user brings a reserved-seat voucher having individual information described thereon (for example, his or her full name and the like) and the user's identification card to the event site. In a case where an administrator of the event determines that the individual information on the reserved-seat voucher and the user's identification card match each other, a reserved-seat ticket is issued to the user. In this method, it is necessary to issue as many reserved-seat vouchers and reserved-seat tickets as the number of users. Therefore, depending on the number of users, the cost of the tickers would be enormous. Such problem is not limited to the tickets, and is a common problem that occurs when multiple types of sheets having information formed thereon are issued to the user.

DETAILED DESCRIPTION

Figure 1:
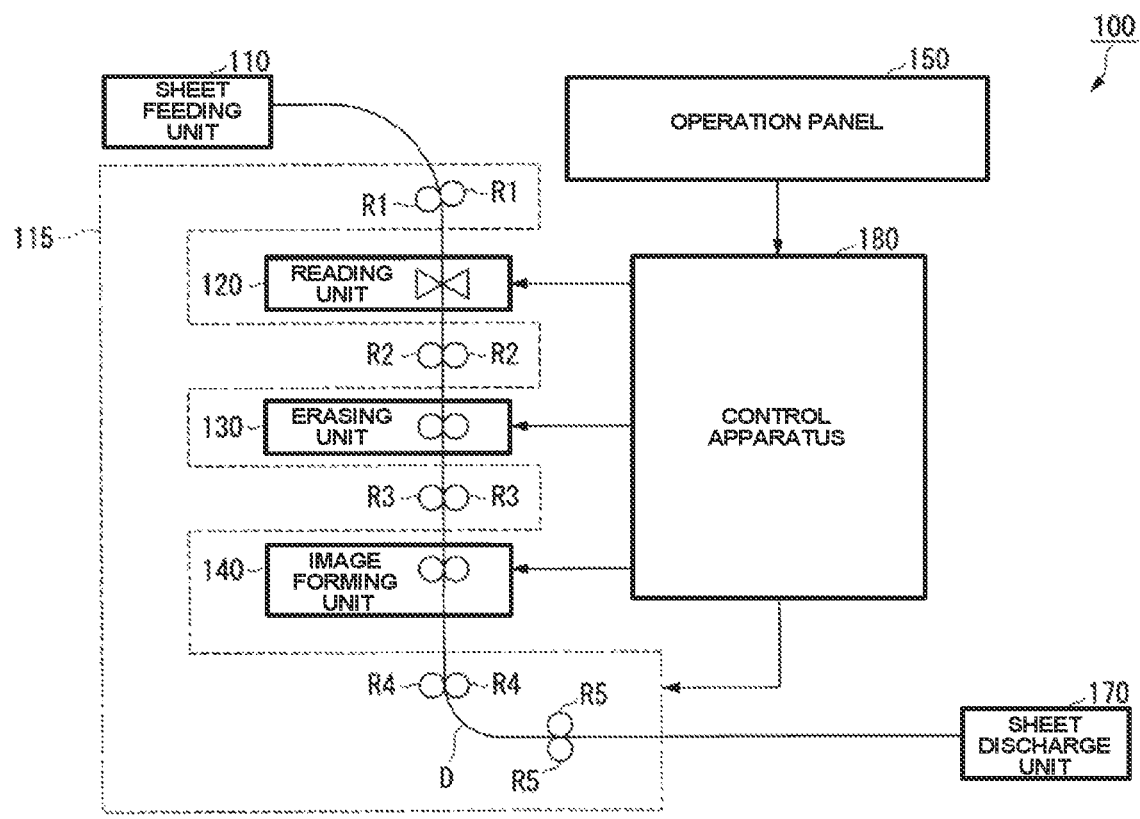
FIG. 1 is a figure illustrating an example of a schematic configuration of an image erasing apparatus according to an embodiment.

According to an embodiment, a reading unit, an erasing unit, an image forming unit, and a controller are provided. The reading unit reads identification information formed on a sheet conveyed. The erasing unit is provided at a downstream side with respect to the reading unit in a conveying direction of the sheet. The erasing unit erases a part or all of a first image formed on the sheet. The image forming unit is provided at a downstream side with respect to the erasing unit in the conveying direction of the sheet. The image forming unit forms an image on the sheet from which the erasing unit has erased the first image. The controller obtains image data corresponding to the identification information that is read by the reading unit. The controller controls the image forming unit so that a second image indicated by the obtained image data is formed on the sheet from which the first image has been erased.

Hereinafter, further, an image erasing apparatus according to an embodiment will be explained with reference to drawings. In the drawings, the same reference numerals denote the same or similar portions.

FIG. 1 is a figure illustrating an example of a schematic configuration of an image erasing apparatus 100 according to the embodiment. The image erasing apparatus 100 according to the embodiment reads unique identification information 3 formed on a sheet S, and thereafter, erases an original first image 2 formed on the sheet S. The image erasing apparatus 100 forms a second image, which is associated with the read identification information 3, onto the sheet S from which the first image 2 has been erased. For example, the sheet S is a paper medium on which an image (character, picture, figure, and the like) can be formed. In the present embodiment, a case where the sheet S is a ticket used in an event and the like will be explained for example. In the following explanation, a sheet S having a first image 2 (see FIG. 2) and identification information 3 (see FIG. 2) formed thereon may be referred to as a first sheet S1. A sheet S having a final image 4 including the second image (see FIG. 3) formed therein may be referred to as a second sheet S2. The first sheet S1 and the second sheet S2 are the same sheets S, and the difference therebetween lies in the images formed on the sheets S. The first sheet S1 is changed into the second sheet S2 by changing the content of the image of the sheet S (description content) by using the image erasing apparatus 100 according to the embodiment. It should be noted that the first image 2 of the first sheet S1 may be formed by an apparatus different from the image erasing apparatus 100, or may be formed by the image erasing apparatus 100. In the present embodiment, for example, erasing processing erasing a formed image by using a color agent that can be decolorized with heat will be explained as an example of erasing processing.

The image erasing apparatus 100 according to the present embodiment applies decolorization processing for erasing the color of the image by applying heat of a predetermined temperature (which will be hereinafter referred to as a decolorization temperature or a target temperature) or more to the first sheet S1 having an image formed thereon with a color-erasable color agent, i.e., a color-erasable toner, a color-erasable ink, or the like. The color-erasable color agent includes a color reaction chemical compound, a developing agent, and an erasing agent. An example of a color reaction chemical compound includes leuco dye. An example of a developing agent includes phenols. When the erasing agent is heated, the erasing agent includes a substance that is compatible with the color reaction chemical compound but does not have compatibility with the developing agent. The color-erasable color agent develops color due to interaction between the color reaction chemical compound and the developing agent, and when heated to a decolorization temperature or higher, the interaction between the color reaction chemical compound and the developing agent is eliminated, so that the color-erasable color agent is decolorized.

Figure 2:
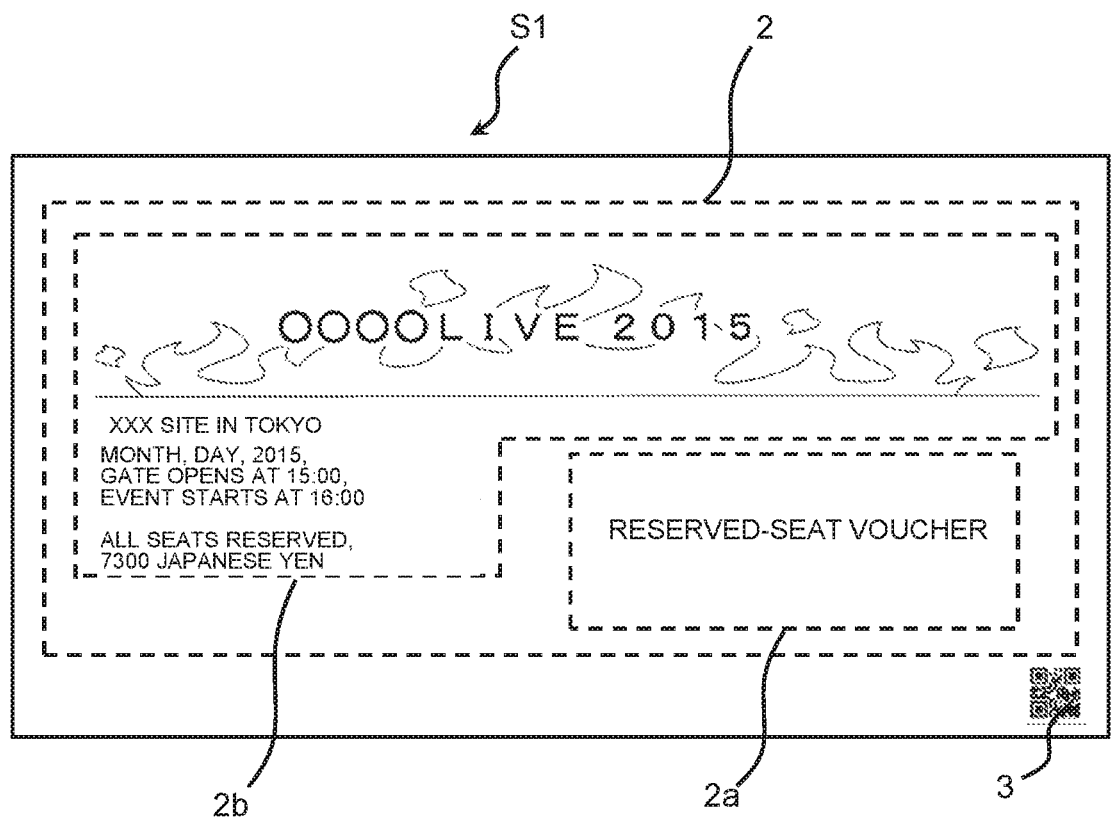
FIG. 2 is a figure illustrating an example of a schematic configuration of a first sheet S1 according to the embodiment.

FIG. 2 is a figure illustrating an example of the first sheet S1 according to the embodiment. As illustrated in FIG. 2, the first sheet S1 includes a first image 2 and an identification information 3. The first image 2 is an image formed with a color-erasable color agent. For example, the first image 2 is an image including information related to reserved-seat voucher for a ticket of an event and the like. More specifically, for example, the first image 2 includes an image of a character string "XXX site in Tokyo" as information about the location of the event. Further, the first image 2 includes an image of a character string "Month, day, 2015, gate opens at 15:00, event starts at 16:00, all seats reserved, 7300 Japanese Yen" as information about a date and time and the like. Further, the first image 2 includes an image of a character string "reserved-seat voucher" as information indicating that the first sheet S1 is a reserved-seat voucher. In the present embodiment, when the first sheet S1 is put into the image erasing apparatus 100, the entire first image 2 is erased by the image erasing apparatus 100. It should be noted that the image to be erased is not limited to the entire first image 2. As explained later, a part of the first image 2 may be erased by the image erasing apparatus 100. In the present embodiment, the final image 4 and the second image are the same image. Therefore, in the following explanation about the present embodiment, the second image may be referred to as a second image 4. It should be noted that the final image 4 and the second image may be different images as explained later. The identification information 3 is identification information indicating a unique identifier allocated to each sheet S. For example, the identification information 3 is identification information identifying the sheet S or the user of the sheet S. The identification information 3 is formed on the sheet S as an image of a QR code (registered trademark), a two-dimensional code, or the like. The identification information 3 may be an image formed with a color-erasable color agent, or may be an image formed with a decolorization-impossible color agent.

Figure 3:
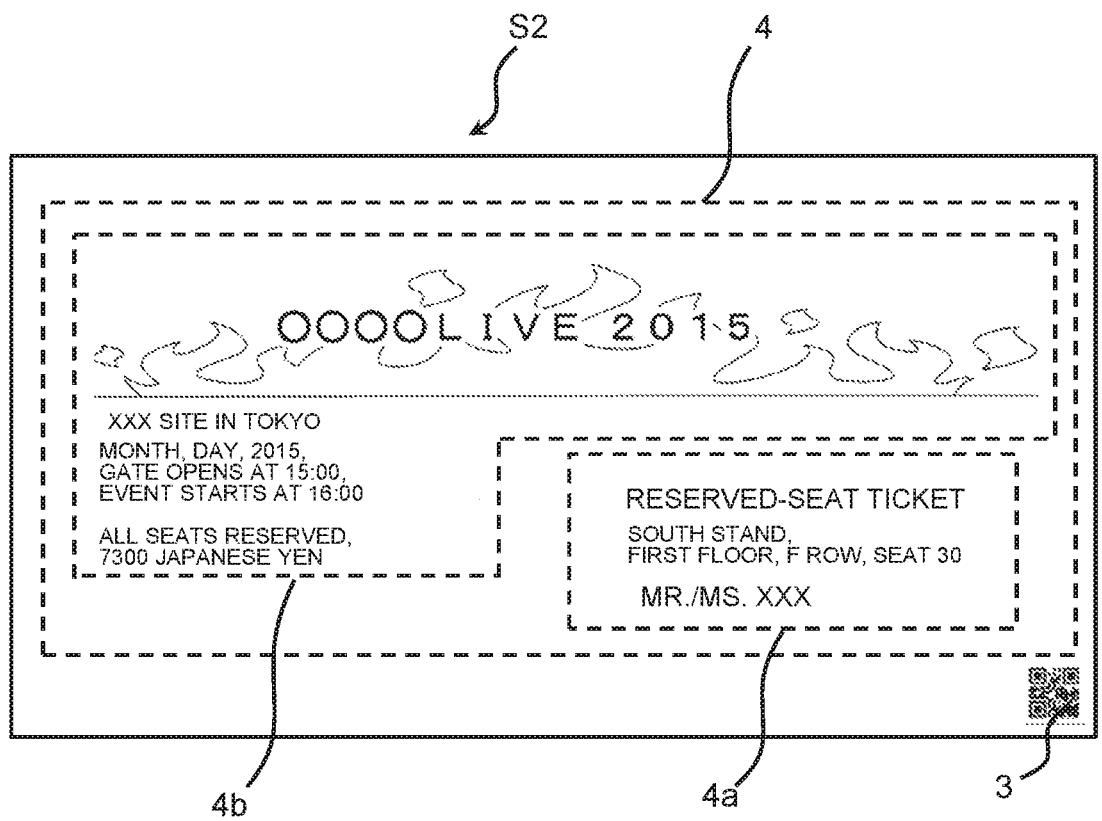
FIG. 3 is a figure illustrating an example of a schematic configuration of a second sheet S2 according to the embodiment.

FIG. 3 is a figure illustrating an example of a second sheet S2 according to the embodiment. As illustrated in FIG. 3, the second sheet S2 includes the final image 4 (second image 4) and identification information 3. The image data of the second image 4 is associated with the identification information 3, and is stored in advance in an image storage area 190 of a storage unit 193 explained later. In other words, the storage unit 193 explained later previously stores the image data of the second image 4 and the identification information 3 associated with the image data. The first image 2 on the first sheet S1 is erased by the image erasing apparatus 100 and thereafter the second image 4 is formed on the sheet S by the image erasing apparatus 100. The second image 4 may be an image formed with a color-erasable color agent, or may be an image formed with a decolorization-impossible color agent. For example, the second image 4 is an image including information about the reserved-seat ticket for the ticket of the event and the like. More specifically, for example, the second image 4 includes the image of the character string "XXX site in Tokyo" as the information about the location of the event. Furthermore, the second image 4 includes the image of the character string "Month, day, 2015, gate opens at 15:00, event starts at 16:00, all seats reserved, 7300 Japanese Yen" as the information about the date and time and the like. Still more, the second image 4 includes the image of the character string "reserved-seat ticket" as information indicating that the second sheet S2 is a reserved-seat ticket. Still more, the second image 4 includes an image of a character string "South stand, first floor, F row, seat 30, Mr./Ms. xxx" as information about the location of the seat and the individual name. In the present embodiment, a case where the identification information 3 is not erased by the image erasing apparatus 100 will be explained, but the present embodiment is not limited thereto.

For example, the identification information 3 may be formed with a color-erasable color agent, and may be erased at the same time as when the first image 2 is erased. In this case, the image erasing apparatus 100 reads the identification information 3, and thereafter, carries out the erasing processing of the first image 2 and the identification information 3. It should be noted that the first image 2 and the second image 4 may be completely different images, or may be images at least a portion of which is different. In the present embodiment, as illustrated in FIG. 2, the first image 2 includes a partial image 2a and a partial image 2b. As illustrated in FIG. 3, the second image 4 includes a partial image 4a and a partial image 4b. The partial image 2a and the partial image 4a are images different from each other. The partial image 2b and the partial image 4b are images different from each other. More specifically, the first image 2 and the second image 4 are partially different images. In other words, the first image 2 and the second image 4 are partially same images.

Back to FIG. 1, the configuration of the image erasing apparatus 100 will be explained. The image erasing apparatus 100 includes a sheet feeding unit 110, a conveying unit 115, a reading unit 120, an erasing unit 130, an image forming unit 140, an operation panel 150, a sheet discharge unit 170, and a control apparatus 180.

The sheet feeding unit 110 feeds the sheet S having the first image 2 and the identification information 3 formed thereon into the inside of the image erasing apparatus 100. The sheet feeding unit 110 includes feeding ports, pickup rollers, and the like with which the sheet S is fed. For example, the sheet S having the first image 2 and the identification information 3 formed thereon is fed by the user into the sheet feeding unit 110. It should be noted that the sheet feeding unit 110 may have a tray on which the sheet S is placed. In this case, the sheet S having the first image 2 and the identification information 3 formed thereon is placed on the tray by the user.

The conveying unit 115 includes rollers R1 to R5 and a conveying path D for conveying the sheet S. The roller R1 is, for example, a pair of a driving roller and a driven roller. Each of the rollers R2 to R5 has the same configuration as the roller R1.

In the present embodiment, the sheet S is conveyed from the sheet feeding unit 110 to the sheet discharge unit 170, and accordingly, the side of the sheet feeding unit 110 will be referred to as an upstream side in the conveying direction of the sheet S, and the side of the sheet discharge unit 170 will be referred to as a downstream side in the conveying direction of the sheet S.

Then, the sheet S fed by the sheet feeding unit 110 is conveyed by the conveying unit 115 to the reading unit 120 provided at the downstream side with respect to the sheet feeding unit 110.

The reading unit 120 includes an optical scanning system. The optical scanning system includes imaging devices such as a CCD (Charge Coupled Devices) or a CIS (Contact Image Sensor). For example, the scanning optical system includes multiple imaging devices. The imaging devices are arranged in one-dimensional or two-dimensional array forms. The reading unit 120 scans the sheet S fed from the sheet feeding unit 110 via the roller R1, and reads the identification information 3 of the sheet S. The reading unit 120 outputs the read identification information 3 to the control apparatus 180 based on a command of a controller 191 explained later. The read identification information 3 is stored to the storage unit 193 explained later.

The sheet S from which the identification information 3 is read by the reading unit 120 is conveyed by the conveying unit 115 to the erasing unit 130 provided at the downstream side with respect to the reading unit 120. The erasing unit 130 includes a pair of rollers and a heater serving as a heating source. For example, the heater is provided in at least one of the pair of rollers. Then, the pair of rollers is heated by the heater. The erasing unit 130 heats the first image 2 of the sheet S to a decolorization temperature (target temperature) via the pair of rollers heated by the heater. The first image 2 explained above is formed using the color-erasable toner with heating. The erasing unit 130 decolorizes the color-erasable toner of the first image 2 by heating the first image 2 of the sheet S. Although not shown, a temperature sensor is provided in proximity to the pair of rollers. The temperature sensor measures the temperature of the pair of rollers, and transmits a measurement result to the control apparatus 180 explained later. It should be noted that the heating source may be a heater and the like using an IH (Induction Heating) technique.

The image forming unit 140 is provide at the downstream side with respect to the erasing unit 130. The image forming unit 140 forms the second image 4 onto the sheet S, which is fed from the erasing unit 130 via the roller R2, based on the image data of the second image 4. The image data of the second image 4 is image data associated with the identification information 3 formed on the sheet S. The image forming unit 140 includes a well-known printer and a well-known fixing unit. The printer forms the second image 4 on, for example, an image carrier in accordance with the image data of the second image 4 transmitted from the control apparatus 180, and transfers the second image 4 from the image carrier to the sheet S. Then, the fixing unit applies a predetermined temperature and pressure to the sheet S and fixes the second image 4, which is transferred to the sheet S, onto the sheet S. At this occasion, the second image 4 formed by the printer may be a color image or a monochrome image. The toner used to form the second image 4 may be an erasable toner or a non-erasable toner.

The sheet discharge unit 170 is a discharge port of the sheet S having the second image 4 formed thereon. The sheet S having the second image 4 formed thereon is retrieved by the user from the sheet discharge unit 170. As described above, when the user feeds the sheet S into the sheet feeding unit 110, the image erasing apparatus 100 reads the identification information 3 formed on the sheet S that has been fed. Then, the image erasing apparatus 100 erases the first image 2 formed on the sheet S. The image erasing apparatus 100 forms the second image 4 corresponding to the read identification information 3 onto the sheet S from which the first image 2 has been erased. The image erasing apparatus 100 discharges the sheet S having the second image 4 formed thereon to the sheet discharge unit 170. Therefore, the identical sheet S can be changed from a status in which the first image 2 is formed into a status in which the second image 4 corresponding to the identification information 3 is formed.

The operation panel 150 generates an activation request signal in accordance with user's operation. The activation request signal is a signal indicating a content of processing of reading, decolorization, image forming, and the like. For example, the operation panel 150 has a display unit and an operation unit. The display unit and operation unit is a touch panel type liquid crystal display. It should be noted that the display unit and the operation unit may be separate apparatuses. The operation unit may not be a touch panel type and may be a push type button, a dial type button, or the like.

Figure 4:
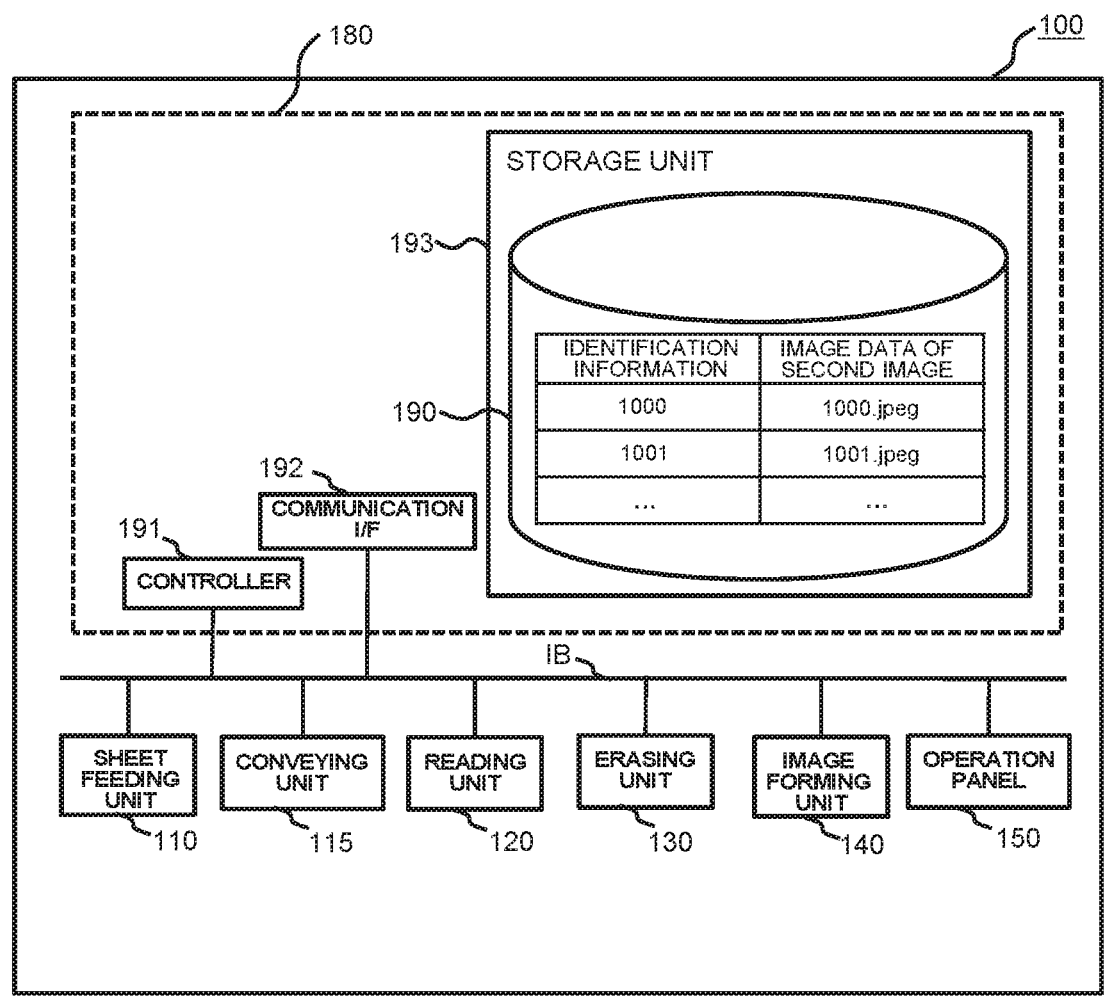
FIG. 4 is a block diagram illustrating an example of a configuration of a control apparatus 180 of an image erasing apparatus according to the embodiment.

Hereinafter, a configuration of the control apparatus 180 according to the embodiment will be explained in details with reference to FIG. 4. FIG. 4 is a figure illustrating an example of the configuration of the control apparatus 180 according to the embodiment. It should be noted that functional units and apparatuses possessed by the image erasing apparatus 100 are connected via an internal bus IB and the like, and can input and output data with each other.

The control apparatus 180 includes the controller 191, a communication interface (communication I/F) 192 and the storage unit 193.

In the controller 191, a CPU (Central Processing Unit) includes a ROM (Read Only Memory) and a RAM (Random Access Memory). The controller 191 controls each of the communication I/F 192 and the storage unit 193, the sheet feeding unit 110, the conveying unit 115, the reading unit 120, the erasing unit 130, the image forming unit 140, and the operation panel 150.

The communication I/F 192 is an interface connected to an external device. For example, the communication I/F 192 communicates with an external apparatus, for example, a server, wirelessly or via a wire. The communication I/F 192 may include a USB connection unit connected to a connection terminal of USB standard, a parallel interface, and the like.

The storage unit 193 stores the identification information 3, the image data of the second image 4, threshold value of the heating temperature of the erasing unit 130 or the image forming unit 140, and information such as an activation request signal. For example, the storage unit 193 is a nonvolatile memory such as an HDD (Hard Disc Drive), an SSD (Solid State Drive), an EEPROM (Electrically Erasable and Programmable Read-Only Memory), and a flash memory. It should be noted that the storage unit 193 may not be the one that is embedded in the control apparatus 180 and may be an external type nonvolatile storage unit.

The storage unit 193 includes an image storage area 190. The image storage area 190 associates and stores the identification information 3 and the image data of the second image 4. When the reading unit 120 reads the identification information 3, the controller 191 obtains, from the image storage area 190, the image data of the second image 4 corresponding to the obtained identification information 3. The controller 191 uses the image forming unit 140 to erase the first image 2 of the sheet S, and thereafter, controls the image erasing apparatus 100 so as to print the second image 4 onto the sheet S based on the obtained image data of the second image 4. It should be noted that this image storage area 190 may be in a server outside of the image erasing apparatus 100. In this case, the controller 191 accesses the image storage area 190 in the external server via the communication I/F 192.

Figure 5:
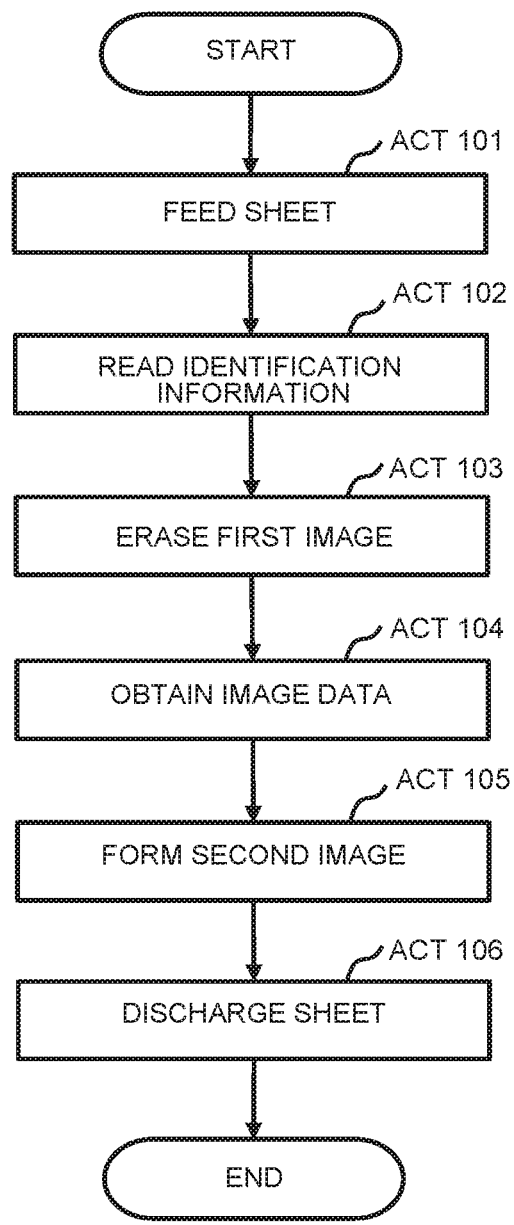
FIG. 5 is a flowchart illustrating processing of an image erasing apparatus according to the embodiment.

The image erasing apparatus 100 as described above executes image forming operation as illustrated in FIG. 5 based on a program set in advance. When the sheet S is fed, the erasing unit 130 is considered to have attained a temperature at which the image of the sheet S can be erased in accordance with the control of the controller 191.

As illustrated in FIG. 5, first, in ACT 101, the controller 191 controls the sheet feeding unit 110. The sheet feeding unit 110 is controlled by the controller 191, so that the sheet S that has been fed is fed in the inside of the main body of the image erasing apparatus 100. Further, the controller 191 controls the roller R1 of the conveying unit 115. The conveying unit 115 uses the roller R1 controlled by the controller 191 to convey the sheet S into the reading unit 120.

In ACT 102, the controller 191 controls the reading unit 120. The reading unit 120 is controlled by the controller 191, so that the reading unit 120 scans the sheet S, and reads the identification information 3. The reading unit 120 transmits the read identification information 3 to the control apparatus 180. The controller 191 temporarily stores the identification information 3 into a predetermined temporary storage area of the storage unit 193. Further, after the identification information 3 is temporarily stored, the controller 191 controls the conveying unit 115 so that the conveying unit 115 conveys the sheet S to the erasing unit 130.

In ACT 103, the controller 191 controls heating of the pair of rollers with a heater so that the pair of rollers of the erasing unit 130 attain a predetermined temperature or more. Then, the sheet S that has been conveyed is heated by the pair of rollers that are kept at a predetermined temperature or more with the heater. The toner of the first image 2 formed on the sheet S is heated to a decolorization temperature with the pair of rollers. The first image 2 formed on the sheet S is heated to the decolorization temperature so that the first image 2 formed on the sheet S is erased.

In ACT 104, the controller 191 reads the identification information 3 from the temporary storage area of the storage unit 193. Further, the controller 191 searches the image storage area 190 to find the identification information 3 that is read from the temporary storage area. As a result of this search, in a case where the image storage area 190 stores the identification information 3 matching the read identification information 3, the controller 191 obtains, from the image storage area 190, the image data of the second image 4 corresponding to this identification information 3.

In ACT 105, the controller 191 controls the image forming unit 140. The image forming unit 140 is controlled by the controller 191, so that the image forming unit 140 forms the second image 4 (final image) on the sheet S based on the image data of the second image 4 obtained in ACT 104.

In ACT 106, the controller 191 controls the conveying unit 115. The conveying unit 115 is controlled by the controller 191, so that the conveying unit 115 discharges the sheet S having the second image 4 formed thereon to the sheet discharge unit 170.

As explained above, the image erasing apparatus 100 reads the identification information 3 formed on the sheet S, and thereafter, erases the original first image 2 formed on the sheet S. The image erasing apparatus 100 forms the final image including the second image 4 onto the sheet S from which the first image 2 has been erased based on the image data of the second image 4 associated with the read identification information 3. Therefore, a new sheet is not required in a case where information different from the information described on the predetermined sheet S is required to be presented to the user. Therefore, according to the present embodiment, the cost of the sheet can be suppressed. The image erasing apparatus 100 forms, on the sheet S, the second image 4 in a region where the first image 2 has been erased. Therefore, on the sheet S, it is not necessary to allocate a region for forming the second image 4 in addition to the region where the first image 2 is formed. More specifically, on the sheet S, it is stuffiest to have a region for forming only the first image 2. Therefore, in a case where information different from the information described on the predetermined sheet S is required to be presented to the user by using the sheet S, it is not necessary to use a sheet S having a large size. Therefore, the user can carry the sheet S without pain.

Hereinafter, a modification of the embodiment will be explained.

The image erasing apparatus 100 may have a notification unit which notifies an occurrence of an error to the user in a case where an error occurs in acquisition of the image data of the second image 4 and formation of the second image 4. For example, in a case where the controller 191 cannot obtain the image data of the second image 4 corresponding to the identification information 3 from the image storage area 190, the notification unit notifies an occurrence of an error to the user. Alternatively, in a case where the image data of the second image 4 corresponding to the identification information 3 does not exist in the image storage area 190, the notification unit notifies an occurrence of an error to the user. For example, the notification unit may notify an error by turning on or blinking a display lamp (not shown) provided in the image erasing apparatus 100. The notification unit may notify an error by outputting an audio message or buzzer sound from an audio device (not shown) provided in the image erasing apparatus 100. The audio device may alternately generate an audio message and a buzzer sound. For example, the audio device is a buzzer or a speaker. The notification unit may notify an error by outputting an error message to the display unit of the operation panel 150.

The image erasing apparatus 100 may have a user authentication unit for authenticating the user. The user authentication unit carries out the individual authentication of the user based on the individual authentication information of the user read by the image erasing apparatus 100. For example, the user authentication unit carries out the individual authentication by comparing and collating the individual authentication information about the user with the authentication information stored in a database, not shown. In a case where the read individual authentication information matches the authentication information stored in the storage unit, not shown, the user authentication unit determines that the individual authentication is successfully completed. In a case where the individual authentication performed with the user authentication unit is successful, the image erasing apparatus 100 starts reading the identification information 3 of the sheet S. For example, the user authentication unit is a face authentication unit, a biometric authentication unit, or a card reader. The face authentication unit reads a feature of the face of the user as individual authentication information. The biometric authentication unit reads a biometric feature of a palm, a finger, or the like of the user as individual authentication information. The card reader reads individual authentication information stored in an ID card and the like possessed by the user. Therefore, the image erasing apparatus 100 can perform identification to confirm that the user has legally purchased a ticket of an event of a concert, a live show, or the like. Therefore, according to the modification of the embodiment explained above, after the identification is completed, the ticket having the second image 4 formed thereon is discharged from the image erasing apparatus 100, and therefore, the image erasing apparatus 100 having a high degree of security can be provided.

In a case where the image erasing apparatus 100 erases the first image 2 as well as the identification information 3, the image erasing apparatus 100 may form the second image 4 and new identification information on the sheet S.

In the above explanation, the image erasing apparatus 100 erases all the first image 2 (see FIG. 2) formed on the sheet S1, but the image erasing apparatus 100 according to the embodiment is not limited thereto. For example, the image erasing apparatus 100 may erase a part of the first image 2 as illustrated in FIG. 2 formed on the sheet S. For example, the image erasing apparatus 100 may erase, as a part of the first image 2, only the partial image 2a as illustrated in FIG. 2. In other words, the image erasing apparatus 100 may leave only the partial image 2b without erasing it. In this case, in association with the identification information 3, the image erasing apparatus 100 previously stores, as image data of the second image, image data of the partial image 4a as illustrated in FIG. 3. In other words, the second image indicated by the image data stored in advance in association with the identification information 3 is different from the first image. Further, after the partial image 2a has been erased, the image erasing apparatus 100 forms, as the second image, only the image 4a onto the sheet S. In a case where only the image 2a is erased and only the image 4a is formed, the content of the final image of the second sheet S2 becomes the same as the final image 4 as illustrated in FIG. 3. For example, the image erasing apparatus 100 may erase, as a part of the first image 2, only the partial image 2b as illustrated in FIG. 2. In other words, the image erasing apparatus 100 may leave only the partial image 2a without erasing it. In this case, in association with the identification information 3, the image erasing apparatus 100 stores in advance, as the image data of the second image, the image data of the partial image 4a and the partial image 4b. As described above, the partial image 4b is the same as the partial image 2b of the first image 2. In other words, the second image indicated by the image data stored in advance in association with the identification information 3 and the first image include the same image. Further, in other words, in the first image 2 formed on the sheet, only the same partial image (partial image 2b) as the second image (partial image 4b) indicated by the image data stored in advance in association with the identification information 3 is erased.

Further, the image erasing apparatus 100 forms the partial image 4a and the partial image 4b (the partial image 2) on the sheet S after the partial image 2b has been erased. However, in a case where the partial image 2b of the first image 2 is erased, and the partial image 4a and the partial image 4b (the partial image 2b) are formed, the content of the final image on the second sheet S2 does not become the same as the final image 4 as illustrated in FIG. 3. More specifically, the final image of the second sheet S2 includes not only the partial image 4a and partial image 4b but also the partial image 2a that is left without being erased. As described above, the image to be erased may be a part of the first image 2 (the partial image 2a or the partial image 2b), or all of the first image 2 (the partial image 2a and the partial image 2b). In a case where the image to be erased is all of the first image 2, the image data of the second image stored in advance in association with the identification information is the image data of the final image 4. In other words, the second image indicated by the image data stored in advance in association with the identification information is the same image as the final image. In contrast, in a case where the image to be erased is a part of the first image 2, the second image indicated by the image data stored in advance in association with the identification information is not the same image as the final image as described above. In a case where a part of the first image 2 is erased as described above, the heating unit of the erasing unit 130 is preferably a thermal head instead of a heater.

In the embodiment explained above, a case where the sheet S is a ticket used in an event and the like has been explained as an example, but the embodiment is not limited thereto. For example, the sheet S may be a lottery ticket or a card for a game. In that case, the image erasing apparatus 100 determines whether the identification information 3 formed on the sheet S is, for example, information indicating a winning ticket or not. For example, the identification information 3 formed on the sheet S is a picture, characters, or a number. In a case where the read identification information 3 is information indicating a winning ticket, the image erasing apparatus 100 erases a first image, and forms a second image indicating a winning ticket on the sheet S.

In the image erasing apparatus 100, the erasing unit 130 may also serve as the fixing unit of the image forming unit 140. More specifically, the erasing unit 130 may heat and pressurize the sheet S having the second image 4 formed thereon to fix the second image onto the sheet S. In this case, the image erasing apparatus 100 is provided with a duplex path for switching back, into the erasing unit 130, the sheet S having the second image transferred thereon by the image forming unit 140.

In the present embodiment, the processing for erasing the color of the toner of the image with heat has been explained as an example of erasing processing, but the erasing processing according to the present embodiment is not limited to the processing for erasing the color of the toner with heat. For example, the erasing processing may be processing for erasing an image on a sheet by emitting light, or may be processing for releasing toner by submerging a sheet into a chemical agent. The erasing processing is intended to make the image invisible on the sheet or to remove toner in order to make the sheet reusable.

The image erasing apparatus 100 according to at least one embodiment explained above reads the identification information 3 formed on the sheet S, and thereafter erase the first image 2 formed on the sheet S. The image erasing apparatus 100 forms the second image 4 associated with the read identification information 3 onto the sheet S from which the first image 2 has been erased. Therefore, in a case where information different from the information described on the predetermined sheet S is required to be presented to the user, it is not necessary to use a new sheet. Therefore, the cost of the sheet can be suppressed.

The functions of the control apparatus 180 according to the embodiment explained above can also be achieved by a computer. In that case, for example, a program for realizing the function of the control apparatus 180 is recorded in a computer readable recording medium. The program recorded in this recording medium is read by a computer system. The computer system may achieve the functions of the control apparatus 180 by executing the program. The "computer system" referred to herein is considered to include an OS and hardware such as peripheral devices. The "computer readable recording medium" means a storage apparatus such as a portable medium, e.g., a flexible disk, a magneto-optical disk, a ROM, a CD-ROM, and the like, and a hard disk provided in a computer system. Further, the "computer readable recording medium" may include those dynamically holding a program for a short period of time such as a communication line for transmitting a program via a communication circuit such as a network such as the Internet and a telephone line. Further, the "computer readable recording medium" may include those holding a program for a certain period of time such as a volatile memory inside of a computer system serving as a server or a client in a case where the program is transmitted via a communication circuit. The program may be those for achieving some of the functions explained above. Further, the program may be those that can achieve the above functions in combination with a program already recorded in the computer system.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
   a feeding unit which supplies a sheet to a conveyance path;
   a reading unit which scans the conveyed sheet to read a first region indicating a first image and a second region indicating identification information that identifies one of the sheet and a user;
   a storage unit which stores image data of a second image associated with the identification information;
   an erasing unit which decolors a part or all of the first image on the sheet conveyed on the conveyance path;
   an image forming unit which forms an image onto the sheet conveyed on the conveyance path after the erasing unit finishes the decoloring; and
   a controller which obtains from the storage unit the image data based on the identification information read by the reading unit, and controls the image forming unit to form, based on the obtained image data, the second image onto the first region of the sheet from which the part or all of the first image has been decolored.

2. The image forming apparatus according to claim 1, wherein
   the controller controls the reading unit to read the identification information formed on the sheet when the feeding unit supplies the sheet to the conveyance path.

3. The image forming apparatus according to claim 1, wherein
   the controller controls the erasing unit to decolor the first image after the reading unit reads the identification information.

4. The image forming apparatus according to claim 2, further comprising:
   a user authentication unit which authenticates the user based on input of individual authentication information corresponding to the user, wherein
   after the user authentication unit authenticates the user, the controller controls the reading unit to read the identification information indicated on the sheet conveyed on the conveyance path.

5. The image forming apparatus according to claim 1, further comprising:
   a notification unit which notifies that an error has occurred when the image data associated with the identification information read by the reading unit is not stored in the storage unit.

6. The image forming apparatus according to claim 1, wherein
   the second image is partially identical to the first image.

7. The image forming apparatus according to claim 6, wherein
   the controller controls the erasing unit to decolor only a part of the first image that is identical to the second image, and
   the controller controls the image forming unit to form the second image on the part of the sheet on which the decoloring has been completed.

8. The image forming apparatus according to claim 6, wherein
   the controller controls the erasing unit to decolor all of the first image formed on the first region of the sheet, and
   the controller controls the image forming unit to form the second image on the first region of the sheet from which all of the first image has been decolored.

9. The image forming apparatus according to claim 1, wherein
   the image data corresponding to the identification information indicates that the second image is different from the first image, and
   the controller controls the erasing unit to decolor a part of the first image formed on the sheet based on the image data, and controls the image forming unit to form the second image on the sheet in a region from which the part of the first image has been decolored.

10. The image forming apparatus according to claim 1, wherein
    the first image indicates first information relating to a predetermined purpose, and
    the second image indicates second information different from the first information and relating to the predetermined purpose.

11. The image forming apparatus according to claim 1, wherein
    the reading unit is provided on the conveyance path,
    the erasing unit is provided on the conveyance path at a downstream side with respect to the reading unit in a conveying direction of the sheet, and
    the image forming unit is provided on the conveyance path at a downstream side with respect to the erasing unit in the conveying direction of the sheet.

12. An image forming method comprising:
    conveying a sheet to a conveyance path;
    scanning the conveyed sheet to read a first region indicating a first image and a second region indicating identification information that identifies one of the sheet and a user;
    decoloring a part or all of the first image on the sheet;
    obtaining image data of a second image associated with the read identification information; and
    based on the obtained image data, forming the second image onto the first region of the sheet from which the part or all of the first image has been decolored.

13. The image forming method according to claim 12, wherein
    the first and second images have information related to each other.

14. The image forming method according to claim 12, further comprising:
    authenticating the user based on input of individual authentication information corresponding to the user, wherein
    the reading includes reading the identification information after the user is authenticated.

15. The image forming method according to claim 12, further comprising:
    notifying that an error has occurred when the image data associated with the read identification information cannot be obtained.

16. The image forming method according to claim 12, wherein
    the second image is partially identical to the first image.

17. The image forming method according to claim 16, wherein
    the decoloring includes decoloring only a part of the first image that is identical to the second image, and the forming includes forming the second image on the part of the sheet on which the decoloring has been completed.

18. The image forming method according to claim 16, wherein
the decoloring includes decoloring all of the first image formed on the first region of the sheet, and
the forming includes forming the second image on the first region of the sheet from which all of the first image has been decolored.

19. The image forming method according to claim 16, wherein
the image data corresponding to the identification information indicates that the second image is different from the first image,
the decoloring includes decoloring a part of the first image formed on the sheet based on the image data, and
the forming includes forming the second image on the sheet in a region from which the part of the first image has been decolored.

20. The image forming method according to claim 13, wherein
the first image has first information relating to a predetermined purpose, and
the second image has second information different from the first information and relating to the predetermined purpose.

* * * * *